United States Patent [19]

Khoury et al.

[11] Patent Number: 5,337,170
[45] Date of Patent: Aug. 9, 1994

[54] QUADRATIC OPTICAL PROCESSOR FOR REDUCING MULTIPLICATIVE NOISE AND OTHER USES

[75] Inventors: Jihad Khoury, Arlington; Charles L. Woods, Stow, both of Mass.

[73] Assignee: The United States of America as represented by the Secretary of the Air Force, Washington, D.C.

[21] Appl. No.: 921,541

[22] Filed: Jul. 29, 1992

[51] Int. Cl.$^5$ ............................................. G03H 1/02
[52] U.S. Cl. ............................................ 359/7; 359/29; 359/300; 359/306; 359/561
[58] Field of Search ............... 359/7, 29, 300, 306, 359/559, 561, 563, 564

[56] References Cited

U.S. PATENT DOCUMENTS

| | | | |
|---|---|---|---|
| 3,717,415 | 2/1973 | Woerdman | 359/7 |
| 4,145,671 | 3/1979 | Hellwarth | 369/300 |
| 4,299,489 | 11/1981 | Thery et al. | 359/559 |
| 4,566,757 | 1/1986 | Fusek et al. | 359/29 |
| 4,726,639 | 2/1988 | Brody | 359/7 |

Primary Examiner—Edward K. Look
Assistant Examiner—F. Daniel Lopez
Attorney, Agent, or Firm—Robert L. Nathans; Donald J. Singer

[57] ABSTRACT

A degenerate four-wave mixing arrangement employs a photorefractive crystal as a real time holographic recording medium to record a hologram of the noisy optical signal. The signal passes through the crystal and is phase conjugated by a self pumped barium titanate phase conjugator, and the resulting phase conjugate beam reads out the hologram and multiplicative noise is substantially reduced in the optical output signal.

22 Claims, 2 Drawing Sheets

QUADRATIC OPTICAL PROCESSOR FOR REDUCING MULTIPLICATIVE NOISE AND OTHER USES

BACKGROUND OF THE INVENTION

The present invention relates to the field of optical signal processing.

A number of techniques have been described in the literature that compensate for the effect of multiplicative noise in images. A majority of these techniques are based on reducing temporal coherence or on signal averaging (for example, using moving apertures or rotating diffusers). The drawbacks of these techniques are that reduction of temporal coherence restricts the applicability of coherent optical processors, and that averaging methods are not typically real-time. In addition, digital processing of speckle images may be achieved after electronic detection by averaging, or by applying homomorphic filtering. In this latter technique, the scalar-multiplicative noise (occurring on electronic detection) is logarithmically transformed into an additive noise which can then be reduced by Wiener filtering. One technique for converting multiplicative speckle noise to additive noise entails recording the speckled image in an logarithmic intensity detector, which automatically removes the phase information and provides a logarithmic transform. The fundamental step in all of these image processing techniques is some form of nonlinear intensity conversion at the image plane.

A technique utilized in the present invention is based on optical quadratic processing of the input signal, which immediately results in the output of the square of the magnitude of a complex amplitude input. In the degenerate four wave mixing implementation, this output appears as a scalar amplitude modulation of the phase conjugate of the reference wavefront.

BRIEF SUMMARY OF AN EMBODIMENT OF THE INVENTION

A new architecture is provided for reducing multiplicative complex noise on coherently imaged amplitude objects. This technique uses a quadratic nonlinearity to restore the coherence of the signal, usually producing an output at a constant phase (phase cancellation). This process converts the complex multiplicative noise into a signal term and an additive signal-dependent noise term.

In accordance with a currently preferred embodiment of the invention, a photorefractive crystal (such as bismuth germanium oxide, barium titanate, or gallium phosphide) is employed as a real time holographic recording medium in which we use a uniform reference beam to record an image plane hologram of the noisy object. The object beam passes through this image plane photorefractive crystal and is phase conjugated by a self pumped phase conjugator using barium titanate. This phase conjugate beam reads out the hologram, and the output appears counter-propagating to the original plane wave reference beam.

In this degenerate four wave mixing implementation, the exact output is multiplied by the phase conjugate of the reference wavefront. For a real device, precise quadratic processing will occur over a limited dynamic range, but even nonlinearities will convert complex multiplicative patterns into a positive real modulation on the reference phase conjugate beam. This restores the coherence of the input signal as addressed by the reference wavefront, regenerating a coherent signal component. The coherence of the signal (which had been completely destroyed by the multiplicative complex noise) is reconstructed to match the coherence specified by the reference beam.

The coherence of the signal in many optical systems is known and controlled. For example, the output of an amplitude modulated spatial light modulator (SLM) is normally required to be planar, spherical, or cylindrical depending on the device design. In addition, lasers and guided wave devices have well defined wavefront patterns which must be matched for the efficient input or output coupling of light. In general, optical systems are designed for input and output signals with a specific coherence, numerical aperture(s) or wavefront pattern(s).

For the case of an amplitude modulated input signal whose coherence has been destroyed by complex multiplicative noise, the output is a planar wavefront modulated by the square of the magnitude of the noisy image. The coherent signal has been restored and the remaining noise is now additive and can be removed by nonlinear filtering in the Fourier plane as is known in the art.

This quadratic optical processor may be used to reduce noise and restore signal coherence in optical signal processing devices such as spatial light modulators, optical correlators, optical associative memories, optical couplers, lasers, and optical feedback systems. These devices have applications in pattern recognition systems, target tracking, target designation, guidance, image processing, and laser beam cleanup.

The processor has other uses to be described.

BRIEF DESCRIPTION OF THE DRAWINGS

Other objects, features, and advantages of the present invention will become apparent upon study of the following description, taken in conjunction with the drawings in which.

DETAILED DESCRIPTION

Figure 1:
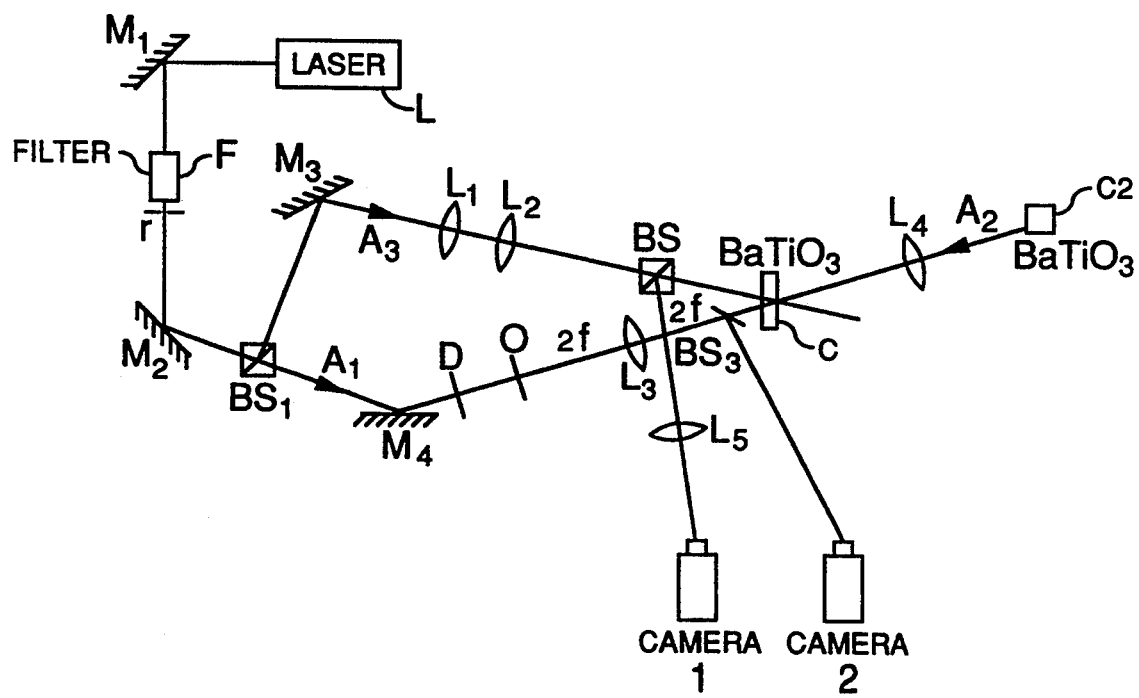
FIG. 1 illustrates a photorefractive quadratic processor for converting multiplicative to additive noise.

Conversion of multiplicative noise to additive noise has been achieved through using four wave mixing. The output of the mixer is the product of the noisy image, its conjugate (produced by self pumped phase conjugator), and the reference beam. Let $A_1$, $A_2$, and $A_3$ to be the noisy input, the phase conjugated readout beam, and the uniform planar reference beam respectively. Representing $A_1$ and $A_2$ in terms of the product of the image information, s, and the complex speckle noise, n, yields, $$A_1 = sn, \quad (1)$$

and $$A_2 = DA_1^* = Ds^*n^* \quad (2)$$

where D represents any distortion from the phase conjugator which produced $A_2$. For the purposes of this analysis, this distortion and any nonuniformities in the reference beam will be combined with an effective noise term to produce an effective signal, $s_e$, $$S_e = D|s|^2|n|^2 A_3^* \quad (3)$$

where one attempts to achieve an uniform reference beam and an exact phase conjugate signal. This processor enables the phases of $A_1$ and $A_2$ to cancel, and the output at the input image plane is given by, $$A_4 = g|s|^2|n|^2 D = g s_b |n|^2 D \quad (4)$$

where we have made the assumption that we are dealing with perfect optical device and the binary amplitude object, $S_b$, and the constant g accounts for such factors as photorefractive diffraction efficiency. The appropriate optical bias for quadratic processing in photorefractive degenerate four-wave mixing may be achieved by using a sufficiently intense reference beam. This bias sets the dynamic range for quadratic conversion, but this bias is not particularly critical for this noise reduction process. For objects containing significant grey scale, the squaring operation changes the dynamic range of the signal but does not affect the resolution.

The Fourier transform of the output is then given by $$FT(A_4) = FT(g s_b |n|^2) = g S_b^* N^* N^* \quad (5)$$

where N and S are the Fourier transforms of n and s and are functions of spatial frequencies. According to the second order statistics of speckle, the amplitude noise, $|n|^2$, has a strong dc component, giving for its Fourier spectrum a delta function at the origin and a new spectral distribution N' corresponding to the spatial extent of the noise. Half of the noise energy is distributed in the central peak and the rest is in the surrounding noise, giving, $$N^* N^* = d(0,0) + N' \quad (6)$$

where d is an approximation of a delta function whose width is essentially determined by the full aperture of the input image and whose integrated strength is half of the noise spectral energy. This produces a Fourier transform of the output of the sum of the image transform and an additive signal-dependent noise of $$FT(A_4) = g S_b + g S_b^* N' \quad (7)$$

where equal energies are in both components. Since the second term (the noise) is distributed in a much larger area, the first term (the signal) has a much higher intensity than the noise and may be separated from the noise by using nonlinear filtering from, for example, a variable thresholding photorefractive filter.

In the experimental setup shown in FIG. 1, the illumination was provided by an argon ion laser L, operated at 514.5 nanometers with an intracavity etalon. The beam is spatially filtered via M1, F and M2 and split with a beam splitter BS1 to produce two beams, $A_1$ and $A_3$. Beam $A_3$ is used as a clean planar reference beam. The other beam, $A_1$, is passed through a diffuser plate D of ground glass to impose multiplicative complex noise on the phase component of the signal. The image information is imposed on the beam by an Air Force resolution chart 0, providing an amplitude image corrupted by the interference effects caused by the surface granularity of the diffuser plate. A lens L3 images a resolution chart pattern of three diagonal bars into a photorefractive crystal C of barium titanate. The image beam A1 and the reference beam A3 interfere in the crystal, and the transmitted image beam emerging from the first crystal is focussed into a second crystal C2 of barium titanate by lens L4 in such a way as to develop total internal reflection self-pumped phase conjugation. The phase conjugate return beam A2 from this second crystal provides a counterpropagating readout beam proportional to the phase conjugate of the original noisy signal. The device output signal is imaged by L5 upon camera 1. This produces the square of the amplitude of the input beam as an amplitude modulation on the phase conjugate of the reference beam. Here, the output is the product of the uniform plane wave reference, the noisy signal, and the phase conjugate of the noisy signal.

Two TV cameras 1 and 2 have been used to detect the input information as well as the output information. Camera 2 was used to detect both the input and its Fourier transform- This has been determined by changing the distance between camera 2 and lens L3; similarly, camera 1 was used to detect both the output and its Fourier transform.

Our experimental results indicated that Fourier processing is impossible when the signal has complex multiplicative noise. The output after quadratic processing may be Fourier processed even though the signal is slightly degraded by the thickness of the crystal (2.5 mm in our case). A thinner crystal would lead to improved resolution. The Fourier orders of the original image reappeared in the output and are surrounded by additive signal dependent noise. This additive signal dependent noise may be further reduced using variable threshold nonlinear filtering. For simple additive noise reduction see J. Khoury et al., "Noise Reduction Using Adaptive Spatial Filtering in Photorefractive Two Beam Coupling", Optics Letters 16, 748 (1991).

A demonstration of the conversion of multiplicative speckle noise to additive noise in the Fourier transform plane has been carried out. In Fourier transform of the output of the device, the distribution of the signal dependent noise can be flat or drop off with increasing spectral orders, depending on the spectral distribution of the speckle and the signal. This device resembles an amplitude squaring spatial light modulator in the sense that the noisy signal is the input, and the constant phase output carries some dc bias or offset. The phase of the noisy signal has been stripped away. This quadratic processor is a single pass device and can be applied more globally to perform beam cleanup on any dominantly phase-distorted amplitude image.

Our device, in the geometry used here, still has two resolution limitations: the crystal thickness, as mentioned previously, and the angular intersection between the two beams.

To avoid the crystal thickness resolution limitation, one must either use a thinner crystal or extend the depth of focus throughout the crystal. For example, a crystal thickness of 2.5 mm (as used here) would require a rather large effective F-number of approximately 49, which may be achieved by a telephoto lenses L1, and L2 or some other optical arrangement.

The second problem is the angular intersection between the two beams. This creates a smear in the output along the plane of the input and reference beams. This directional smear can be reduced by using a more collinear geometry. However, since in our device we used a transmission grating geometry, reducing the angle between the two beams causes large separations between the interference fringes, and this effect also reduces the resolution.

This resolution problem may be avoided by using a reflection grating which provides the maximum collinear geometry. The limitation in this case is imposed by the resolution of the photorefractive medium. For example, the resolution in BSO can be more than 1000 lines/mm. It is clear, therefore, that the resolution of this devise can be extended to equal or exceed that of other recent photorefractive quadratic processors. See F. Vachs et al., "Photorefractive Square-Law Convertor" Optics Letters 16, 1204–1206 (1991).

MEASURING WAVEFRONT OR SURFACE GRANULARITY

In accordance with the invention, a self-aligning photorefractive autocorrelator is implemented for the real-time use of second order speckle statistics to measure the granularity of the wavefront exiting from a rough surface.

A number of speckle techniques have been described in the literature for metrological measurement of rough surfaces. These techniques usually require multiple speckle measurements, either at different wavelengths or from different angles and are not real-time.

We present a real-time autocorrelation technique for measuring the second order statistics of wavefronts to determine the granularity of rough surfaces. This technique implements a photorefractive quadratic processor by multiplying the Fourier spectrum of a distorted wavefront with its self-aligned phase conjugate. This scheme uses a degenerate four-wave mixing photorefractive phase conjugator in a modified form of that used by White and Yariv. See Applied Physics Letters 37, 5 (1980). The auto-correlation is obtained by the inverse Fourier transform of the product of three beams: the Fourier spectrum of a distorted wavefront from a diffuser plate, its conjugate from a self-pumped phase conjugator, and a clean probe beam. From second order speckle statistics, it is well known that the auto-correlation of speckle has a peak at the center which is surrounded by noise. This characteristic may be applied in two forms to determine the actual surface granularity. The first is based on the ratio of the area of the dc peak intensity to the surrounding noise intensity, and the second is based on the ratio of the area of the main lobe to the area of the surrounding noise. For both methods, we must be certain that the aperture extent is very large compared to the spatial frequency extent of the signal, otherwise the finite pupil size must be taken into consideration.

In one dimension, the autocorrelation function of $f(x)$ is defined as:

$$f(x) \; f(x) = \int_{-\infty}^{\infty} f(\xi) f^*(x - \xi) d\xi \quad (8)$$

Let $f(x)$ characterize the wavefront exiting from a rough phase object, $$f(x) = \sum_{i=1}^{n} r_i(x) \quad (9)$$

where $r_i$ gives the phase shift, $\phi_i$, of the i'th unit cell of the rough surface, defined as $r_i = \exp(j\phi_i)$. Therefore, the autocorrelation function of the wavefront can be written in the form $$A(x) = \left( \sum_{i=1}^{n} r_i(\xi) \right) \times \left( \sum_{i=1}^{n} r^*_j(x - \xi) \right) = \quad (10)$$

$$\sum_{i=j}^{n} (r_i \; r^*_i) + \sum_{i \neq j} (r_i \; r^*_j)$$

The first term on the right side of Equation 10 is the summation of the auto-correlation function of the rough surface cells, and the second term is the summation of their cross correlations. For $x < d$ (d is the average size of the unit cell), the first term contributes to the corrected phase wavefront. However, the second term contributes a wavefront of random spatial phases. It is clear, therefore, that the autocorrelation function has a sharp spike at the origin and is surrounded by noise.

The intensity of both the central spike, S, and the surrounding noise, N, is dependent on the quality of the rough surface, e.g., whether a rough surface is binary, multilevel, or rough ground.

For binary phase rough surfaces, the intensity of the central spike is given by $$S_B = \frac{w^2(d - |x|)^2}{d^2}, \; |x| \leq d \quad (11)$$

0, otherwise where w is the length of the rough surface.

However, the intensity of the noise term is $$N_B \approx 2d(w - |x|), |x| < w. \quad (12)$$

For a rough ground surface (random phase cells), the central spike is and the noise term is $$S_R = (w - |x|)^2 \exp\left[\frac{2|x|}{d}\right] \quad (13)$$

$$N_R = (w - |x|)d \quad (14)$$

Therefore, the signal-to-noise ratio (SNR at $x=0$) for the one dimensional surfaces is $$SNR = \frac{S}{N} = \beta \frac{w}{d} \quad (15)$$

where beta is of the order of unity.

Both SNRs are proportional to the total number of surface cells. In extending these to two dimensions the factor w/d would correspond to the ratio of areas, i.e. to the total number of cells in the rough surface. Therefore, in this first technique, combining the SNR of the autocorrelation measurement with the illuminated rough surface dimensions directly measures the surface granularity (i.e. the dimensions of the cell) as described by $$SNR_{2D} = \frac{w^2}{d^2} \quad (16)$$

The second technique for measuring the granularity requires simultaneously measuring the area of the peak and that of the noise. This is actually an equivalent to the first technique. According to second order speckle statistics, half of the energy in the Fourier plane is in the central peak and the other half is in the surrounding noise. Assuming that the area of the central peak is $A_S$ and its maximum intensity is S, and assuming that the area of the noise is $A_N$ and its average intensity is N, then This technique is equivalent to the result in Equation 16 since the feature size in the autocorrelation plane is inversely $$SNR \equiv \frac{S}{N} = \frac{A_N}{A_S} \quad (17)$$

proportional to the spatial frequency of that feature when it exits from the filter plane (at the BGO crystal).

Figure 2:
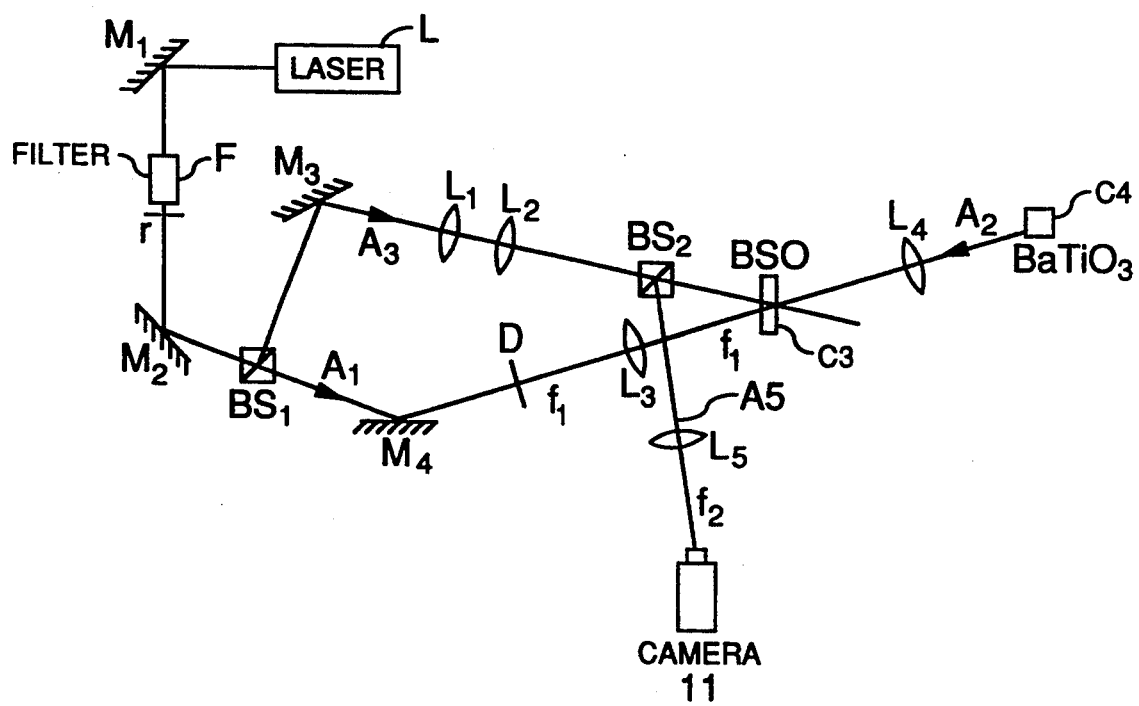
FIG. 2 illustrates a modification of FIG. 1 which is useful for measuring surface granularity or the grain size of speckle.

In the experimental setup shown in FIG. 2, illumination from an argon ion laser L operated at 514.5 nm with an intracavity etalon is spatially filtered by filter F and split by BS1 to produce two beams, one of which is used as a clean planar reference beam A3. The other beam A1 is passed through a ground glass diffuser input plate D, inducing a phase modulation on the beam which now has a granularity to be measured. A lens L3 Fourier transforms this input wavefront into a photorefractive bismuth germanium oxide crystal BGO. The Fourier spectrum of the wavefront and the clean reference beam interfere in the BGO, and the transmitted signal is focussed by lens L4 into a barium titanate crystal C4 to be phase conjugated by total internal reflection. This produces the phase conjugate of the speckle signal and acts as a counterpropagating pump for the BGO. This self pumped phase-conjugate signal A2 back propagates into the BGO, where it satisfies the Bragg matching condition and diffracts to counterpropagate to the reference beam. This quadratically processed output from the BGO has a positive real amplitude (constant phase), and this product of the speckle Fourier spectrum and its conjugate is focussed to produce the input wavefront autocorrelation in the camera 1 plane.

The relatively uniform intensity of the speckle in the Fourier transform plane enables this processor to operate in the quadratic regime when using a reference beam A3 whose intensity is greater than the peak speckle intensity. The dynamic range of the quadratic conversion may be increased by increasing the intensity of the reference beam.

The autocorrelation result includes a central peak surrounded by noise, and some noise has been lost along the horizontal direction. The elongated shape of this pattern is a result of the noncollinearity between the probe beam and the signal beam. This problem may be avoided by using collinear geometry.

Viewing the linear camera output on a three-dimensional display, we measured a SNR of $10^4$, which may be used to determine the input wavefront and, therefore, the surface grain size from $$\frac{w^2}{d^2} = \frac{S}{N} = 10^4. \quad (18)$$

In our experiment, the beam diameter was 4 mm, yielding an average cell size of 40 $\mu$m. In order to verify this result, we photographed the diffuser through an optical microscope. Our visual estimate of the cell size is 50 $\mu$m, which is consistent with the photorefractive autocorrelation measurement.

The uncertainty in the measurement of the SNR is due to (1) the assumption that all of the diffuser cells are circular (as implied in the application of Equation 16), (2) the loss of noise information along the horizontal direction, and (3) the fact that cell size measurements from photorefractive autocorrelation and from microscopic inspection were taken at two different locations on the diffuser input plate.

In summary, we have proposed and demonstrated an auto-correlation technique for measuring the granularity of rough surfaces. This technique utilized a self-aligning autocorrelator or, equivalently, a quadratic processor. It should be possible to implement this with any quadratic processor in the Fourier plane. In addition, this same technique also can be used for measuring the grain size of speckle. Moreover, in industrial applications, the technique is self-aligning and provides a signal for rapidly determining the uniformity of successive samples.

NON-HOLOGRAPHICALLY ADDRESSED PROCESSORS

Figure 3:
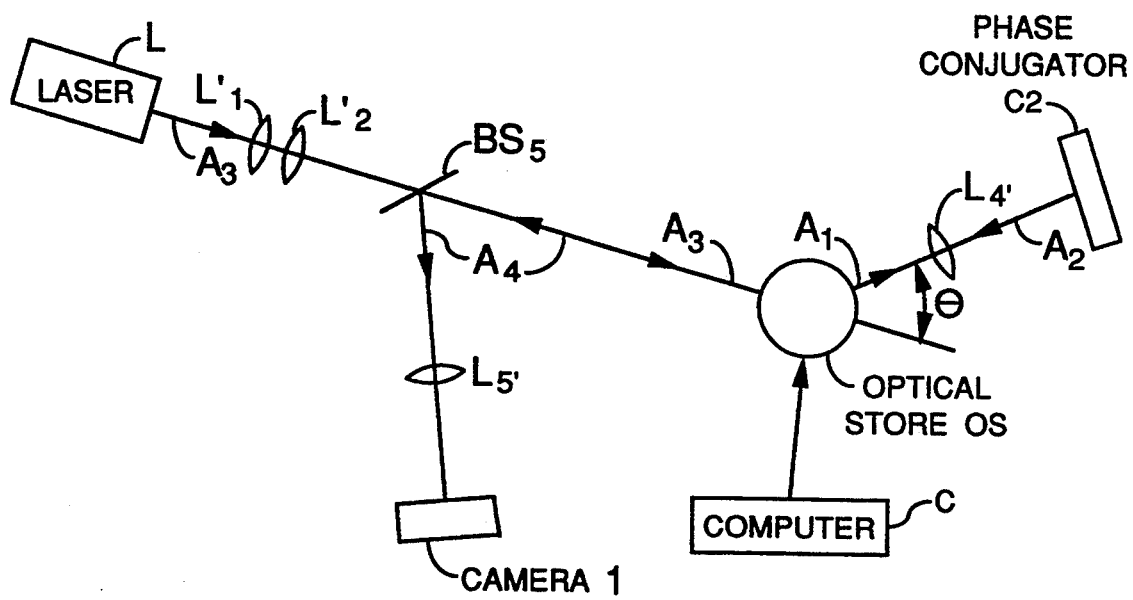
FIG. 3 illustrates a more general embodiment of the invention employing non-holographically addressed optical storage devices such as spatial light modulators.

Other optical storage devices may be employed in accordance with the quadratic processor of the invention which are not holographically addressed as in the embodiments of FIGS. 1 and 2. For example, optical storage means OS of FIG. 3 could be an optically or electrically addressed spatial light modulator (SLM). In the case of an electrically addressed SLM, the optical signal to be quadratically processed is inserted into the SLM in the conventional manner by a computer C or by an electronic image sensor. A coherent optical signal recall beam A3 is directed into the SLM (OS) to produce a recalled optical signal A1 which is phase conjugated by phase conjugator C2 to produce a phase conjugated beam A2 which in turn is transmitted back into the SLM to produce a quadratically processed output beam A4. The output beam may now be recorded by camera 1 which receives the output beam via BS5 and lens L5'. Significantly, an inexpensive amplitude modulating SLM can be used as its phase errors can be corrected in accordance with the method of the invention, and the dynamic range of the SLM will also be enhanced. It will be apparent to the skilled worker in the art that other storage devices such as optical disks, or Bragg cells might be employed if desired. The angle theta will vary depending on what addressing schemes and/or devices are used. This angle could be zero for a planar SLM so that beams A1 and A3 could be colinear.

Thus, other embodiments of the invention will occur to those skilled in the art, and accordingly, the scope of the invention is to be defined by the terms of the following claims and art recognized equivalents thereof. In like manner, the method of the invention may be employed using electronic digital signal processing techniques in place of an optical processing implementation.

We claim:

1. Method of quadratically processing in real time a two-dimensional optical signal comprising the steps of:
   (a) providing a holographic optical storage means;
   (b) producing a hologram of said two-dimensional optical signal within said holographic optical storage means;
   (c) directing a coherent optical signal recall beam into said holographic optical storage means for producing a recalled optical signal;
   (d) phase conjugating the recalled optical signal for producing a phase conjugate beam; and (e) producing a quadratically processed version of the optical signal stored within said holographic optical storage means by transmitting the phase conjugate beam back into the holographic optical storage means.

2. Method of quadratically processing an optical signal comprising the steps of:
   (a) inserting a two-dimensional optical signal into a spatial light modulator;
   (b) directing an optical recall beam into said spatial light modulator to produce a recalled optical signal;
   (c) producing a phase conjugate beam proportional to the phase conjugate of said recalled optical signal; and
   (d) producing a quadratically processed version of the optical signal stored within said spatial light modulator by transmitting the phase conjugate beam back into the spatial light modulator.

3. Method of quadratically processing a two-dimensional optical signal comprising the steps of:
   (a) producing a real time optical hologram of said two-dimensional optical signal;
   (b) producing a phase conjugate beam proportional to the phase conjugate of said two-dimensional optical signal; and
   (c) producing an output beam having an amplitude which is the square of the magnitude of the complex amplitude of the optical signal by combining said phase conjugate beam with said hologram.

4. Method of quadratically processing an optical signal comprising the steps of:
   (a) providing a holographic recording member;
   (b) forming a coherent optical signal upon said holographic recording member;
   (c) directing a coherent reference light beam at said holographic recording member for recording a hologram of said optical signal within said holographic recording member;
   (d) producing a readout beam proportional to the phase conjugate of the said optical signal; and
   (e) directing said readout beam at said holographic recording member for producing an output beam therefrom whose amplitude is the square of magnitude of the complex amplitude of the optical signal.

5. Quadratic optical signal processor for processing a coherent optical signal comprising:
   (a) a holographic recording member;
   (b) projection means for forming the coherent optical signal to be quadratically processed upon said holographic recording member;
   (c) means for directing a coherent reference wavefront at said holographic recording member for recording a hologram of said optical signal within said holographic recording member;
   (d) phase conjugator means for producing a readout beam having the phase conjugate of said optical signal; and
   (e) means for directing said readout beam at said holographic recording member and for producing an output beam therefrom whose amplitude is the square of the magnitude of the complex amplitude of the optical signal.

6. Quadratic optical signal processor for quadratically processing an optical signal comprising:
   (a) a first photorefractive nonlinear element;
   (b) projection means for forming said optical signal to be quadratically processed upon said first photorefractive nonlinear element;
   (c) means for directing a coherent reference light beam at said first photorefractive nonlinear element for recording a hologram of said optical signal to be quadratically processed within said first nonlinear element;
   (d) phase conjugator means for producing a readout beam proportional to the phase conjugate of said optical signal; and
   (e) means for directing said readout beam at said first nonlinear element for producing an output beam therefrom bearing the square of the magnitude of the complex amplitude of the optical signal.

7. The processor of claim 6 wherein said phase conjugator means comprises a second photorefractive nonlinear element.

8. The processor of claim 6 including means for focusing the optical signal in said first nonlinear element upon said second nonlinear element.

9. The processor of claim 6 wherein the means of paragraph (c) includes means for directing a uniform coherent reference light beam having a planar wavefront at said first photorefractive nonlinear element.

10. Method of converting multiplicative noise to additive noise associated with a coherent image light beam being processed comprising the steps of:
    (a) producing an optically written hologram of said coherent image light beam, corrupted by said multiplicative noise;
    (b) producing a phase conjugate beam having the phase conjugate of said coherent image light beam;
    (c) combining said phase conjugate beam with said hologram for producing an output beam whose amplitude is the square of the magnitude of the complex amplitude of the coherent image light beam, thereby to eliminate said multiplicative noise therefrom.

11. Method of converting complex multiplicative noise to additive signal-dependent noise associated with a coherent object light beam being processed comprising the steps of:
    (a) providing a holographic recording member;
    (b) imaging a coherent object light beam bearing an image corrupted by multiplicative noise upon said holographic recording member;
    (c) directing a coherent reference light beam at said holographic recording member for recording a hologram of said coherent object light beam within said holographic recording member;
    (d) producing a readout beam proportional to the phase conjugate of said coherent object light beam; and
    (e) directing said readout beam at said holographic recording member for producing an output beam therefrom whose amplitude is the square of the magnitude of the complex amplitude of the coherent object light beam, thereby to eliminate said complex multiplicative noise from said image.

12. Method of enhancing the dynamic range of a processed optical signal while providing phase correction for any phase distortions thereon comprising the steps of:
    (a) inserting said processed optical signal into a spatial light modulator;

(b) illuminating said spatial light modulator with coherent light to produce an output light modulator optical signal therefrom;

(c) producing a phase conjugate beam proportional to the phase conjugate of said output light modulator optical signal; and (d) directing said phase conjugate beam through said spatial light modulator for producing a processed output signal whose amplitude is the square of the magnitude of the complex amplitude of the signal light beam, thereby to increase the dynamic range of the spatial light modulator and to remove any phase distortions from said processed output optical signal.

13. Method of measuring the granularity of phase variations of a coherent signal beam comprising the steps of:

(a) generating a Fourier transform of said coherent signal beam;

(b) producing a hologram of said Fourier transform of said coherent signal beam;

(c) producing a phase conjugate beam proportional to the phase conjugate of said coherent signal beam;

(d) combining said phase conjugate beam with said hologram for producing an output beam whose amplitude is the square of the magnitude of the complex amplitude of the coherent signal light beam, and;

(e) Fourier transforming said output beam for in turn producing an autocorrelation measurement of the coherent signal beam.

14. The method of claim 13 wherein the autocorrelation measurement has a given signal-to-noise ratio and a correlation peak having a given area and including utilizing the signal-to-noise ratio of the autocorrelation measurement to determine the size of said granularity.

15. The method of claim 14 including simultaneously measuring the area of the correlation peak of the autocorrelation measurement and the area of the noise to determine the size of said granularity.

16. The method of claim 15 wherein the coherent signal beam has a given peak speckle intensity and wherein a reference beam having an intensity greater than the peak speckle intensity is used to produce said hologram in accordance with step (b).

17. The method of claim 14 wherein the coherent signal beam has a given peak speckle intensity and wherein a reference beam having an intensity greater than the peak speckle intensity is used to produce said hologram in accordance with step (b).

18. The method of claim 13 wherein the coherent signal beam has a given peak speckle intensity and wherein a reference beam having an intensity greater than the peak speckle intensity is used to produce said hologram in accordance with step (b).

19. The method of claim 13 including the step of generating said coherent signal beam by directing a uniform coherent beam upon a rough surface having a granularity to be measured before the performance of step (a).

20. Method of measuring the granularity of phase variations of a coherent optical signal beam comprising the steps of:

(a) providing a holographic recording member;

(b) forming a Fourier transform of said coherent optical signal upon said holographic recording member;

(c) directing a weak coherent reference light beam at said holographic recording member for recording a hologram of said Fourier transform within said holographic recording member;

(d) producing a readout beam proportional to the phase conjugate of said Fourier transform;

(e) directing said readout beam at said holographic recording member for producing an output beam therefrom whose amplitude is the square of the magnitude of the complex amplitude of the optical signal; and (f) Fourier transforming said output beam for in turn producing an autocorrelation measurement of said coherent signal beam.

21. The method of claim 20 wherein the autocorrelation measurement has a given signal-to-noise ratio and a correlation peak having a given area and including utilizing the signal-to-noise ratio of the autocorrelation measurement to determine said degree of granularity.

22. The method of claim 21 including simultaneously measuring the area of the correlation peak of the autocorrelation measurement and the area of the noise.

* * * * *